Patented Mar. 18, 1952

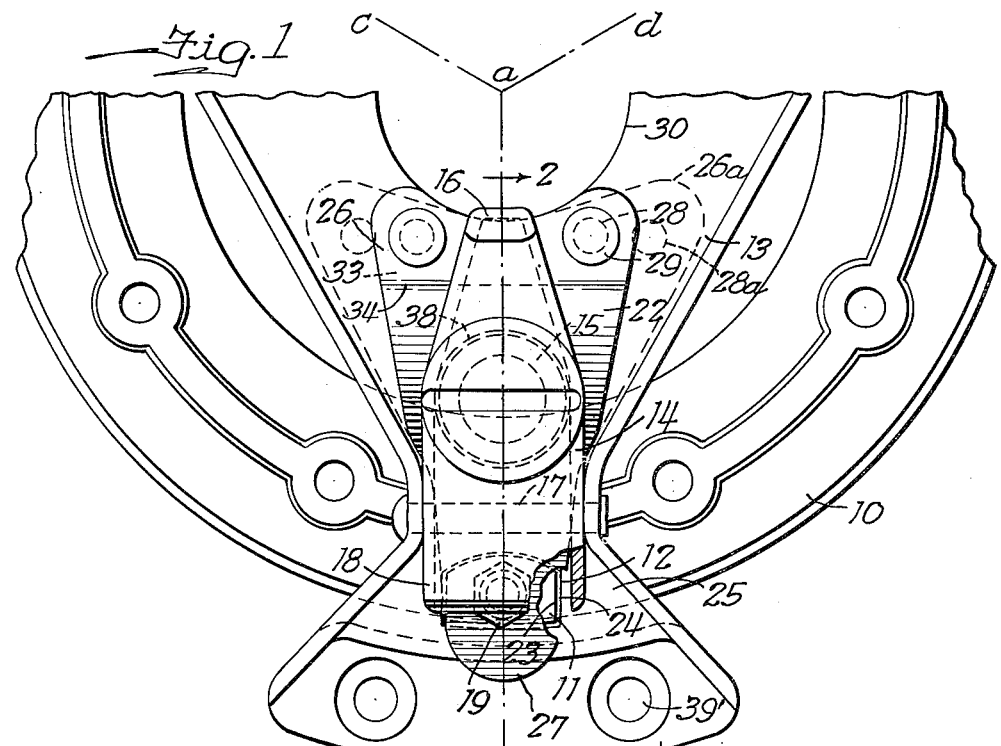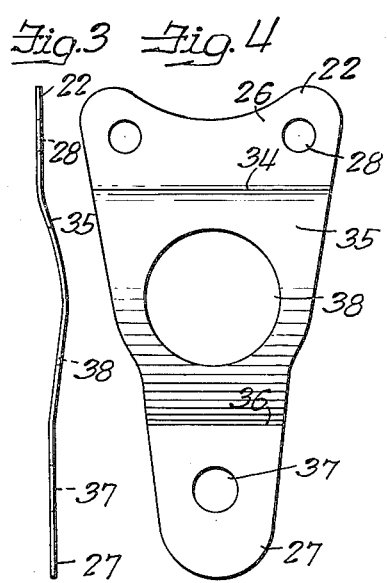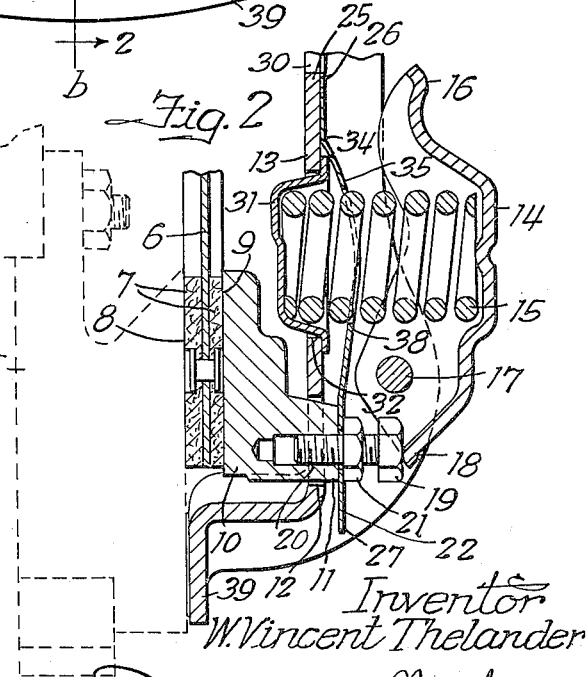

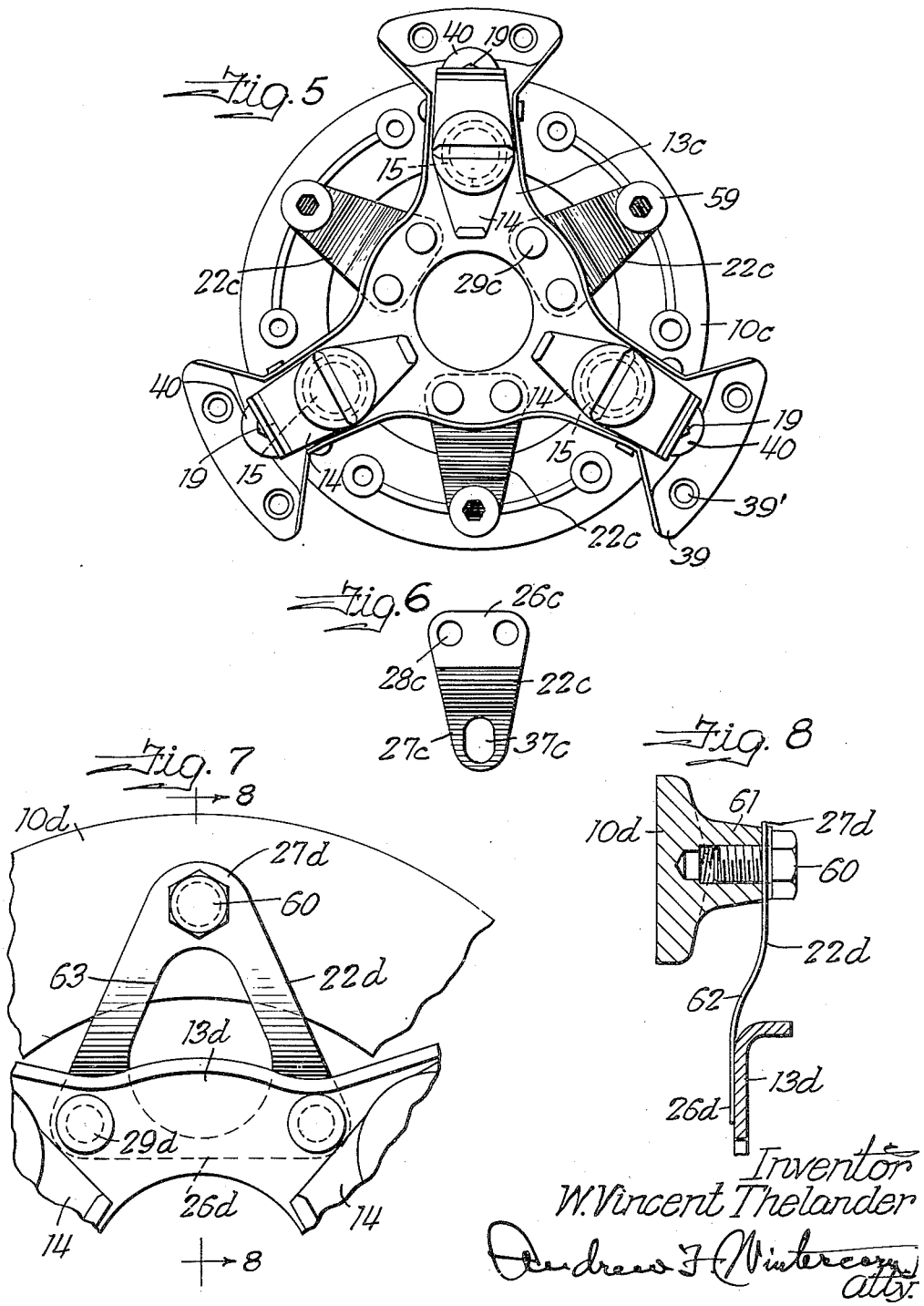

2,589,308

UNITED STATES PATENT OFFICE 2,589,308

FRICTION CLUTCH WITH SPRING SUPPORTED PRESSURE PLATE

W. Vincent Thelander, Auburn, Ind., assignor to Dana Corporation, Toledo, Ohio, a corporation of Virginia Application March 22, 1946, Serial No. 656,327

6 Claims. (Cl. 192—68)

This invention relates to friction clutches for use on automobiles, tractors, and other vehicles, and suitable also for industrial applications.

In clutches like that disclosed in my Patent 2,214,780, issued September 17, 1940, the pressure plate is moved toward engaged position by novel spring-pressed release levers and is moved toward disengaged position by spring means acting between the back plate and drive lugs on the pressure plate. However, these lugs projecting through openings in the back plate with a predetermined operating clearance caused an objectionable rattle unless special provisions were made to eliminate the hammer noise. In a co-pending application of E. M. DeCoursey and myself, Serial No. 611,040, now Patent No. 2,515,277, issued July 8, 1950, we disclose the use of small wedge-shaped blocks, suitably mounted on the back plate in the drive lug openings and arranged to have abutment with the drive lugs on the "coast" side and normally urged inwardly with respect to the axis of rotation of the clutch by suitable spring means so as to afford ample working clearance for the drive lugs in the openings only while these flying wedges are in retracted position, the clearance being taken up automatically when the flywheel attains a predetermined R. P. M., at which the flying wedges move outwardly under centrifugal force against the action of the spring means and take up all clearance.

It is the principal object of my invention to provide a simpler and more economical and more practical construction. Leaf-spring means are provided between the radially inner portion of the back plate and the back of the pressure plate, in certain of the clutches herein disclosed, to serve the double purpose of returning the pressure plate to retracted position upon release of the clutch and also assuming drive torque when the clutch is engaged, so that the lugs on the pressure plate which heretofore caused the objectionable rattle in contact with the sides of the openings in the back plate are kept more or less centralized with respect to said openings, thereby eliminating rattling.

The invention is illustrated in the accompanying drawings, in which

Fig. 1 is a rear view of a clutch showing one embodiment of my invention, only one of three of the release levers being shown, and the combination drive, anti-rattle and return leaf spring being shown associated with the same drive lug of the pressure plate;

Fig. 2 is a section on the line 2—2 of Fig. 1;

Figs. 3 and 4 are two views of the aforesaid leaf-spring removed from the clutch;

Fig. 5 is a rear view of still another clutch showing still another form and arrangement of leaf-springs acting in the same direction as those disclosed in Fig. 1;

Fig. 6 is a view of one of the leaf-springs removed from the clutch shown in Fig. 5;

Fig. 7 is a fragmentary rear view of still another clutch similar to that shown in Fig. 5 but using a slightly different form of triangular leaf-spring, and Fig. 8 is a sectional detail on the line 8—8 of Fig. 7.

Similar reference numerals are applied to corresponding parts throughout the views.

Referring to Figs. 1 and 2, the reference numeral 5 is applied to a flywheel mounted on the rear end of the usual engine crank shaft and forming the driving element. 6 designates a clutch disc having the usual facings 7 for engagement with the flat back face 8 on the flywheel and the flat front face 9 on the pressure plate 10, the disk 6 being mounted in the usual way by means of a hub portion splined on the front end of a shaft constituting the driven element and extending rearwardly from the clutch into the gear box of the transmission in the usual way. The clutch illustrated is like that disclosed in my Patent 2,214,780, mentioned above, but it should be understood that the present invention is not limited to that particular clutch but may be used on any friction clutch where a similar problem of providing anti-rattle means is presented; that is to say, in any friction clutch wherein the pressure plate has rearward projections or drive lugs like that indicated at 11, slidably engaged in openings like that indicated at 12, in a back plate like that indicated at 13, or in back plate segments, bearing in mind that in the earlier Thelander et al. 1,985,301, issued December 25, 1934, the conventional back plate was eliminated in one form, and a number of separate brackets fastened to the flywheel were substituted, each bracket forming what was called a lever support. In accordance with the two patents mentioned, a plurality of release levers 14 are provided which are arranged to be depressed against the action of compression springs 15 by clutch pedal operation of a throw-out bearing (not shown) against the inner ends 16 of the levers to disengage the clutch. These levers are pivoted on cross-pins 17 near their outer ends 18 to transmit pressure of the springs 15 in a multiplied degree to the pressure plate 10, and, although the pressure of the springs 15 is multiplied through the levers 14 for clutch engagement, it is apparent that there is an appreciable mechanical advantage in the disengagement of the clutch by reason of the fact that the springs 15 are closer to the pivots 17 than the inner ends 16 of the levers where the throwout bearing engages, thus making for lighter pedal action. This arrangement is also of advantage from the standpoint that there is very little loss of spring pressure when the clutch facings 7 become worn, because so little expansion of the springs is permitted for a given amount of wear of the facings. The lugs 11 have set screws 19 threaded in longitudinal holes 20 provided therein, and, when the heads of the screws 19 are properly adjusted relative to the outer ends 18 of the levers 14, lock nuts 21 on the shanks of the screws 19 are tightened to lock the screws in adjusted position. In taking up for wear on the facings 7, the screws 19 are backed up a turn or so after the lock nuts 21 have been loosened, and when the correct relationship of the clutch parts has been reproduced in that way, the screws 19 are locked again in adjusted position by tightening the nuts 21.

When the levers 14 are depressed to disengage the clutch, leaf springs 22, of which there are as many per clutch as there are release levers 14, one associated with each of said levers, serve to retract the pressure plate so that there will no longer be any transmission of drive to the disc 6. The lugs 11 have flat side faces 23 substantially parallel to one another and to the radii of the pressure plate which in the unimproved clutch slidably engaged the opposite sides 24 of the slots or openings 12 provided in the rear wall 25 of the back plate to transmit drive from the flywheel through the back plate and pressure plate to the disc 6. However, it is at these points of clearance between the back plate and pressure plate drive lugs, that the hammer noise is produced which the leaf springs 22 provided in accordance with my invention are designed to eliminate. In other words, the springs 22 are designed to serve the double purpose of urging the pressure plate 10 normally toward retracted position and assuming drive torque so as to maintain the drive lugs 11 more or less centralized with respect to the slots or openings 12 in the back plate so as to prevent rattling.

The leaf springs 22 are generally triangular in form and are disposed substantially radially with respect to the back plate with the base portion 26 innermost and the apex portion 27 outermost. The end 27 is parallel but offset in relation to the end 26 to afford yield lengthwise of the leaf spring, as required for the axial movement of the plate 10 relative to plate 13. The base portion 26 has holes 28 provided therein at the opposite ends to receive rivets 29 by means of which the leaf spring is rigidly secured to the outer side of the back plate next to the central opening 30 through which the driven shaft extends. The width of the base portion 26 may be increased as indicated in dotted lines at 26a so as to permit wider spacing of the rivet holes 28, as indicated in dotted lines at 28a, for better leverage in the assumption of torque by the leaf springs so that there will be less likelihood of the springs loosening or breaking in service. A sheet metal cup 31 entered in an opening 32 in the back wall 25 of the back plate serves as an abutment for the inner end of the spring 15. The leaf spring 22 is bent outwardly with respect to the base portion 26 on a transverse line 34 in an arc to define a humped intermediate portion 35. The outer or apex portion 27 is flat, the transverse line 36 defining the juncture of the bulged intermediate portion 35 and the end portion 27. A center hole 37 is provided in the end portion 27 to receive the shank of the screw 19 so as to permit attaching the outer end portion of the leaf spring 22 to the drive lug or projection 11 by means of the screw 19 and lock nut 21 in the manner shown in Fig. 2. The opposite end portions 26 and 27 are substantially parallel to one another as appears in Figs. 2 and 3, and the humped intermediate portion 35 projects out of the planes of the two end portions, and that fact, coupled up with the fact that the leaf spring is tapered toward the outer end 27, accounts for a certain desired degree of flexibility in the outer end 27 relative to the inner end 26 in a plane parallel to the planes of the pressure plate 10 and the back wall 25 of the back plate 13. The leaf springs 22, in other words, afford a spring driving connection between the back plate and pressure plate but are much more easily flexible in a plane at right angles to the driving plane, as required for the axial movement of the pressure plate to and from engaged position. The springs 22 in assuming the torque tend to keep the drive lugs 11 more or less centrally located in the holes or slots 12 in the back plate but will yield to the slight extent necessary to allow the drive lugs to have drive transmitted thereto from the back plate, without any objectionable rattling. A large central hole 38 is provided in the humped intermediate portion 35 of each of the leaf springs 22 through which the compression springs 15, associated with the release levers 14, extend with ample radical clearance. In conclusion, it will, of course, be understood that the back plate 13 is fastened by means of its attaching flanges 39 to the back of the flywheel, screws (which are not shown) being entered through the holes 39' in the flanges 39 for that purpose.

In operation, assuming that there are three leaf springs 22 in a 120° circumferentially spaced relationship as indicated by the center-lines ab, ac and ad in Fig. 1, the leaf springs 22 serve to prevent rattling in the operation of the clutch as they transmit spring-cushioned drive from the back plate 13 to the pressure plate 10, the torsional yield of the leaf springs being limited positively but without rattle when the drive lugs 11 come into engagement with the drive side of the slots or holes 12 in the back plate. The springs 22 furthermore center the pressure plate 10 accurately with respect to the back plate 13 for smooth operation and give the desired return spring action upon release of the clutch. This construction enables the provision of larger clearances between the pressure plate lugs 11 and the slots or holes 12 in the back plate because of the cushioned drive action of the leaf springs 22. However, in the event of breakage of any one or more of the leaf springs 22, it will be obvious that the clutch will still operate because the drive lugs 11, in that event, still project through the slots or holes 12 to permit positive transmission of power from the back plate 13 directly to the pressure plate 10. This construction is also of advantage in the shipment of the clutch assembly because the leaf springs 22 serve as stops and positively limit the forward movement of the pressure plate away from the back plate under the action of the springs 15 by contact with the back plate, as should be clear from a study of Fig. 2. This clutch is obviously well ventilated, the pressure plate 10 being exposed throughout the major portion of its circumference between those portions 39 of the back plate that are attached to the flywheel.

Referring now to Figs. 5 and 6, the pressure plate 10c and back plate 13c are like those disclosed in Fig. 1, the release levers 14 being identical with the ones shown in said figure and having coiled compression springs 15 cooperating therewith for engagement of the clutch under spring pressure. The outer ends of the release levers 14 in this clutch cooperate with set screws 19 projecting rearwardly from lugs provided on the pressure plate in the same way as in Fig. 1. However, in this clutch, there are three leaf springs 22c, each of which is of triangular form similar to what are shown in Figs. 1 and 4, these springs being located midway between the release levers and being fastened to the back plate by their wider base portions 26c and fastened to the pressure plate by their narrower apex portions 27c. Rivets 29c are entered through the two holes 28c in the base portion and through registering holes in the web of the back plate to permanently secure the leaf springs to the back plate at their inner ends. Screws 59 are entered through radially elongated slots 37c in the outer end portions of the leaf springs and are threaded in registering holes provided in the pressure plate to slidably connect the parts together at these points, allowing a predetermined amount of relative movement therebetween, without, however, changing the centered relationship of the pressure plate with respect to the back plate. The outer end portions 27c are in a plane parallel to but spaced forwardly from the plane of the inner end portions 26c. The operation of this clutch is substantially identical with that of Fig. 1.

Referring to Fig. 7 showing still another form of triangular leaf spring 22d, this design is intended to be used in the same way as the springs 22c. It has a wider base portion 26d for the same reason as was mentioned in regard to the widening of the inner end 26a of the leaf spring 22, which is indicated in dotted lines in Fig. 1. The inner end portion 26d is fastened by means of rivets 29d to the back plate 13d, and the outer end portion 27d is fastened to the pressure plate 10d by a screw 60. The screws 60 thread in bosses 61 projecting rearwardly from the pressure plate as clearly appears in Fig. 8, and the leaf springs 22d are curved lengthwise, as indicated at 62, so as to offset the outer end portion 27d in parallel relation to the inner end portion 26d. The enlarged generally triangular shaped opening 63 provided in the center of each spring makes for greater flexibility and lightness and improves the springiness of the leaf springs in the drive plane. The operation of this clutch is otherwise substantially the same as that disclosed in Figs. 5 and 6.

It is believed the foregoing description conveys a good understanding of the objects and advantages of my invention. The appended claims have been drawn to cover all legitimate modifications and adaptations.

I claim:

1. In a clutch comprising, in combination, a flywheel, a back plate carried thereby, a driven member, an axially movable pressure plate having a plurality of rearwardly extending drive projections in circumferentially spaced relation received with some lateral clearance in registering openings provided therefor in said back plate, spring means to transmit engaging pressure to said pressure plate, and release levers for causing disengagement, the improvement which consists in the provision in combination with said drive projections of a plurality of flexible elongated leaf springs each having a longitudinally curved portion intermediate the ends thereof, said springs being affixed at one end to said pressure plate in circumferentially spaced relation and extending radially inwardly and affixed at the other end to said back plate, said leaf springs being flexible relatively easily lengthwise to permit axial movement of said pressure plate but being flexible much less easily edgewise, whereby they are adapted to support the pressure plate so that the drive projections are substantially centered in the openings in the back plate when the pressure plate is not transmitting torque, said leaf springs resisting lateral displacement of said drive projections from centered position when the pressure plate transmits torque, until said drive projections engage one side of said openings and afford positive drive, thereby positively limiting flexure of said leaf springs.

2. In a clutch comprising, in combination, a flywheel, a back plate carried thereby, a driven member, an axially movable pressure plate having a plurality of rearwardly extending drive projections in circumferentially spaced relation received with some lateral clearance in registering openings provided therefor in said back plate, spring means to transmit engaging pressure to said pressure plate, and release levers for causing disengagement, the improvement which consists in the provision in combination with said drive projections of a plurality of flexible elongated leaf springs each having a longitudinally curved portion intermediate the ends thereof, said springs being of generally triangular form and disposed in circumferentially spaced relation substantially radially relative to said back plate and pressure plate and having the wide end innermost, and each affixed at circumferentially spaced points thereof to the back plate, said leaf springs each having the narrow outer end thereof affixed at one point to the rear end of an associated drive projection, said leaf springs being flexible relatively easily lengthwise to permit axial movement of said pressure plate but being flexible much less easily edgewise, whereby they are adapted to support the pressure plate so that the drive projections are substantially centered in the openings in the back plate when the pressure plate is not transmitting torque, said leaf springs resisting lateral displacement of said drive projections from centered position when the pressure plate transmits torque, until said drive projections engage one side of said openings and afford positive drive, thereby positively limiting flexure of said leaf springs.

3. In a clutch comprising, in combination, a flywheel, a back plate carried thereby, a driven member, and an axially movable pressure plate having a plurality of rearwardly extending drive projections in circumferentially spaced relation received with some lateral clearance in registering openings provided therefor in said back plate, the improvement which consists in the provision in combination with said drive projections of a plurality of flexible elongated leaf springs each having a longitudinally curved portion intermediate the ends thereof, said springs being of generally triangular form and disposed in circumferentially spaced relation substantially radially relative to said back plate and pressure plate and having the wide end innermost and each affixed at circumferentially spaced points thereof to the back plate, said leaf springs each having the narrow outer end thereof affixed at one point to the rear end of an associated drive projection, said leaf springs being flexible relatively easily lengthwise to permit axial movement of said pressure plate but being flexible much less easily edge wise, whereby there are adapted to support the pressure plate so that the drive projections are substantially centered in the openings in the back plate when the pressure plate is not transmitting torque, said leaf springs resisting lateral displacement of said drive projections from centered position when the pressure plate transmits torque, until said drive projections engage one side of said openings and afford positive drive, thereby positively limiting flexure of said leaf springs, each leaf spring having an opening provided therein in the intermediate portion thereof, a coiled compression spring extending through each of said leaf springs in said openings and supported by the back plate, and an elongated release lever associated with each of said drive projections and associated leaf spring and coiled spring and radially disposed relative to the back plate and pivoted near its outer end on the back plate and having the outer end arranged to transmit pressure to the pressure plate through the medium of its drive projection, said coiled compression spring bearing against the lever on the other side of said pivot at such a distance from the pivot that the pressure of the coiled spring is multiplied in the action of said lever on the pressure plate, said lever being movable manually in the other direction at its inner end at a point farther removed from the pivot than said coiled spring, whereby to secure mechanical advantage in relieving the spring pressure from the pressure plate.

4. A clutch as set forth in claim 3, including an adjusting screw threaded in and projecting rearwardly from each drive projection for abutment with the outer end of the associated release lever, and a lock nut threaded on the adjusting screw and tightenable against the drive projection to secure the adjusting screw in adjusted position, said screw and nut serving also to affix the leaf spring to the drive projection.

5. In a clutch comprising, in combination, a flywheel, a back plate carried thereby, a driven member, an axially movable pressure plate having a plurality of rearwardly extending drive projections in circumferentially spaced relation received with some lateral clearance in registering openings provided therefor in said back plate, spring means to transmit engaging pressure to said pressure plate, and release levers for causing disengagement, the improvement which consists in the provision in combination with said drive projections of a plurality of flexible elongated leaf springs, each having a longitudinally curved portion intermediate the ends thereof, said springs being disposed radially relative to said back plate in circumferentially spaced relation and affixed at the inner end to said back plate without freedom for pivotal movement, and affixed at the outer end to the rear ends of the drive projections, said leaf springs being flexible relatively easily lengthwise to permit axial movement of said pressure plate but being flexible much less easily edgewise, whereby they are adapted to support the pressure plate so that the drive projections are substantially centered in the openings in the back plate when the pressure plate is not transmitting torque, said leaf springs resisting lateral displacement of said drive projections from centered position when the pressure plate transmits torque, until said drive projections engage one side of said openings and afford positive drive, thereby positively limiting flexure of said leaf springs.

6. A clutch as set forth in claim 1, wherein the leaf springs serve the additional purpose of urging the pressure plate normally toward retracted position.

W. VINCENT THELANDER.

REFERENCES CITED

The following references are of record in the file of this patent:

UNITED STATES PATENTS

| Number | Name | Date |
|---|---|---|
| Re. 21,937 | Wemp | Nov. 4, 1941 |
| 1,601,235 | Bullard | Sept. 28, 1926 |
| 1,944,337 | Wemp | June 23, 1934 |
| 2,070,813 | Stearns et al. | Feb. 16, 1937 |
| 2,126,149 | Spase | Aug. 9, 1938 |
| 2,214,780 | Thelander | Sept. 17, 1940 |
| 2,277,557 | Nutt | Mar. 24, 1942 |
| 2,300,187 | Wemp | Oct. 27, 1942 |